C. F. SPERY.
MACHINE FOR MAKING FINS FOR RADIATOR TUBES AND AUTOMATICALLY APPLYING THEM TO SAID TUBES.
APPLICATION FILED MAR. 24, 1919.

1,322,366.

Patented Nov. 18, 1919.
4 SHEETS—SHEET 1.

WITNESS:
A. Stark.

INVENTOR:
CHARLES F. SPERY.
BY
Michael Stark & Sons
ATTORNEYS.

C. F. SPERY.
MACHINE FOR MAKING FINS FOR RADIATOR TUBES AND AUTOMATICALLY APPLYING THEM TO SAID TUBES.
APPLICATION FILED MAR. 24, 1919.

1,322,366.

Patented Nov. 18, 1919.
4 SHEETS—SHEET 2.

WITNESS:
A. Stark.

INVENTOR:
CHARLES F. SPERY,
Michael J. Stark & Son
ATTORNEYS.

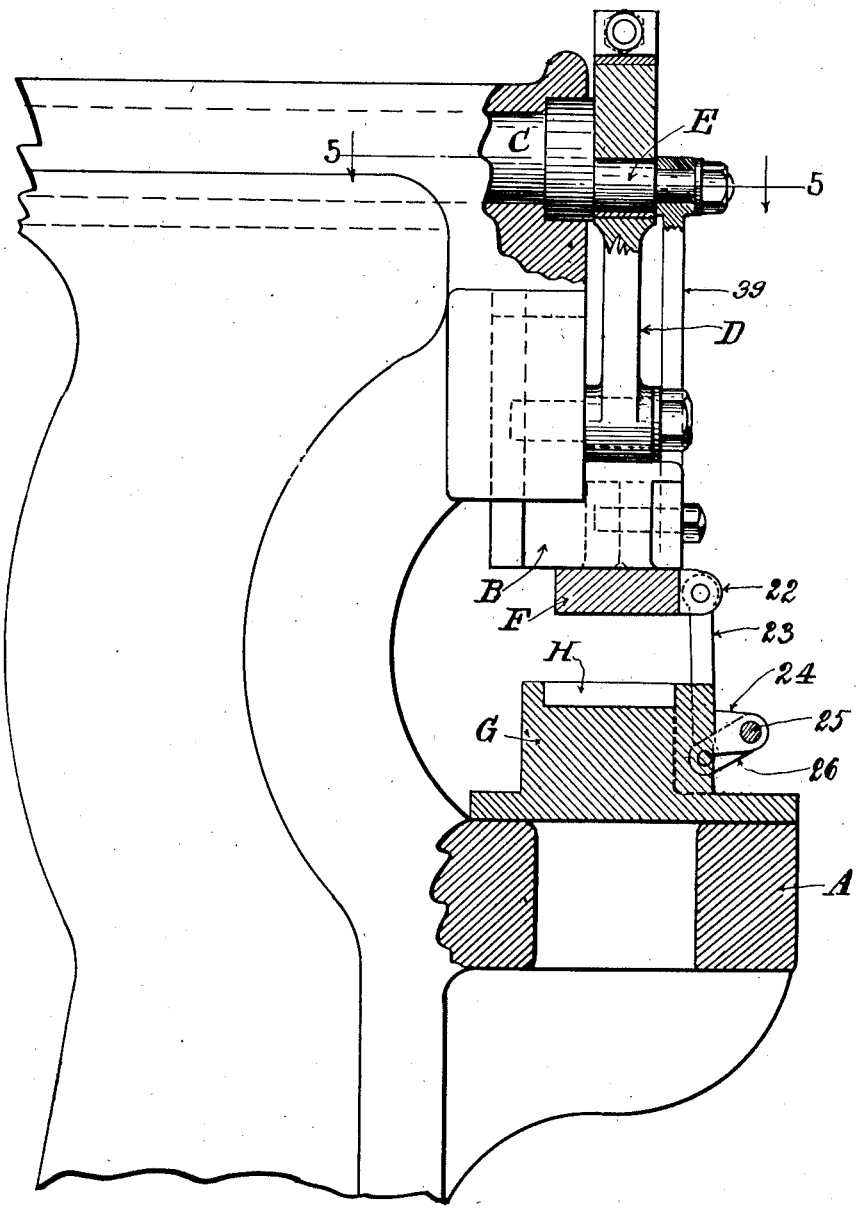

C. F. SPERY.
MACHINE FOR MAKING FINS FOR RADIATOR TUBES AND AUTOMATICALLY APPLYING THEM TO SAID TUBES.
APPLICATION FILED MAR. 24, 1919.
1,322,366.
Patented Nov. 18, 1919.
4 SHEETS—SHEET 4.
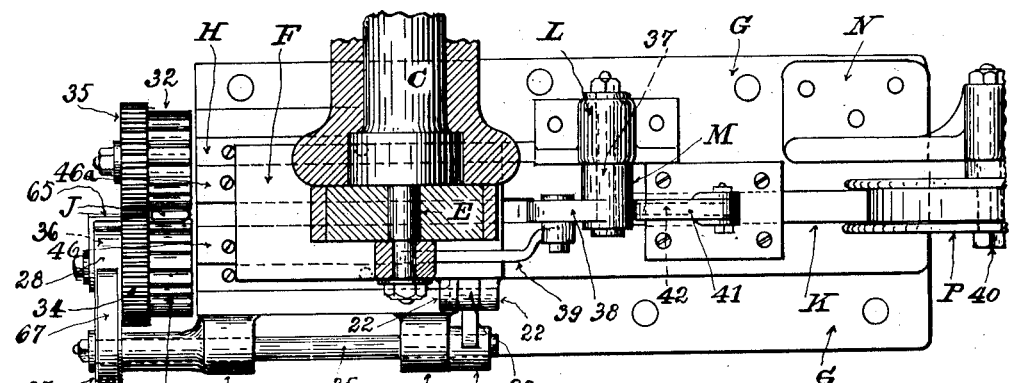
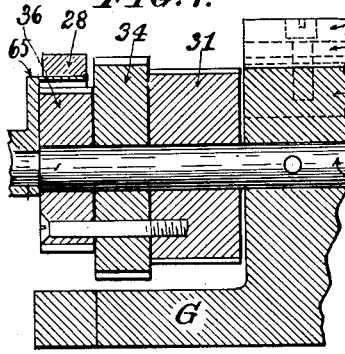
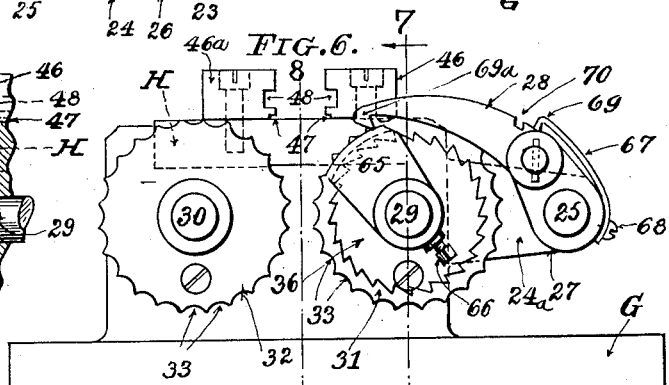
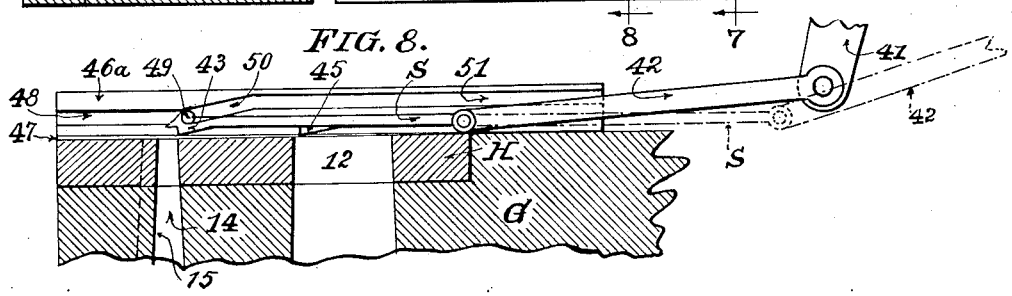
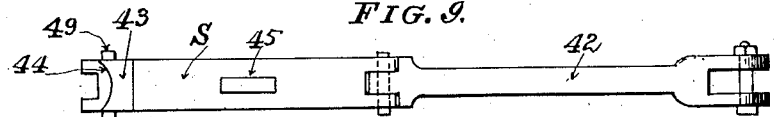
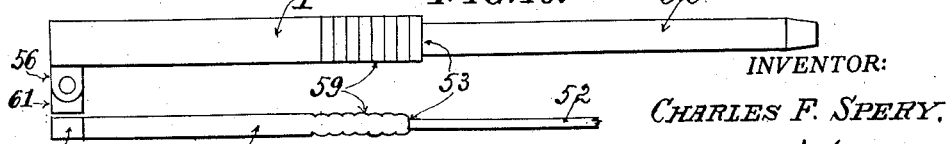
INVENTOR:
CHARLES F. SPERY.
BY
Michael Stark & Sons
ATTORNEYS.

UNITED STATES PATENT OFFICE.

CHARLES F. SPERY, OF CHICAGO, ILLINOIS.

MACHINE FOR MAKING FINS FOR RADIATOR-TUBES AND AUTOMATICALLY APPLYING THEM TO SAID TUBES.

1,322,366.  Specification of Letters Patent.  Patented Nov. 18, 1919.

Application filed March 24, 1919. Serial No. 284,802.

*To all whom it may concern:*

Be it known that I, CHARLES F. SPERY, a citizen of the United States, and a resident of the city of Chicago, in the county of Cook and State of Illinois, have invented a certain new and useful Improvement in Machines for Making Fins for Radiator-Tubes and Automatically Applying Them to Said Tubes; and I do hereby declare that the following description of my said invention, taken in connection with the accompanying sheet of drawings, forms a full, clear, and exact specification, which will enable others skilled in the art to which it appertains to make and use the same.

My invention relates generally to improvements in a machine for making the fins for radiator tubes and automatically applying them to said tubes; and it consists, essentially, in the novel and peculiar combination of parts and details of construction, as hereinafter first fully set forth and described and then pointed out in the claims.

The object of my present invention is the production of an efficient and serviceable machine for rapidly making fins for radiator tubes and automatically applying these fins to said tubes. These tubes are usually flat oblong structures, the two side walls of which are transversely corrugated or crimped to afford between the crimps equally spaced crotches in which the fins, of substantially horseshoe contour, are located and when thus applied the tube is dipped into a bath of molten solder to integrally connect the fins to the tubes.

In order to accomplish this desirable object, I construct this machine, in the preferred embodiment of my invention, as shown in the drawings forming a part of the specification, and in which—

Fig. 4 is a side elevation, partly in section of a portion of the mechanism for operating the feeding rolls for the water tubes, the sectional portion being on line 4—4 of Fig. 1.

Fig. 5 is a plan of a portion of the punching press and the mechanism for making the fins and applying them automatically to the water tube.

Fig. 6 is an end elevation of the ratchet feeding mechanism for the water tubes, the connecting gear wheels being omitted to show the feed rolls in solid lines.

Fig. 7 is a sectional view of the same on line 7—7 of Fig. 6.

Fig. 8 is a detail sectional view of the push bar and a portion of the parts connected therewith, on line 8—8 of Fig. 6.

Fig. 9 is an inverted plan of the push bar and its connecting rod.

Fig. 10 is a plan view of the mandrel employed in this device; and Fig. 11 is an edge view of the same.

Fig. 12 is a sectional view of a fragment of the machine on line 12—12 of Fig. 13.

Fig. 13 is a sectional view of the same on line 13—13 of Fig. 12.

Like parts are designated by the same characters and symbols of reference in all the figures.

Figure 1:
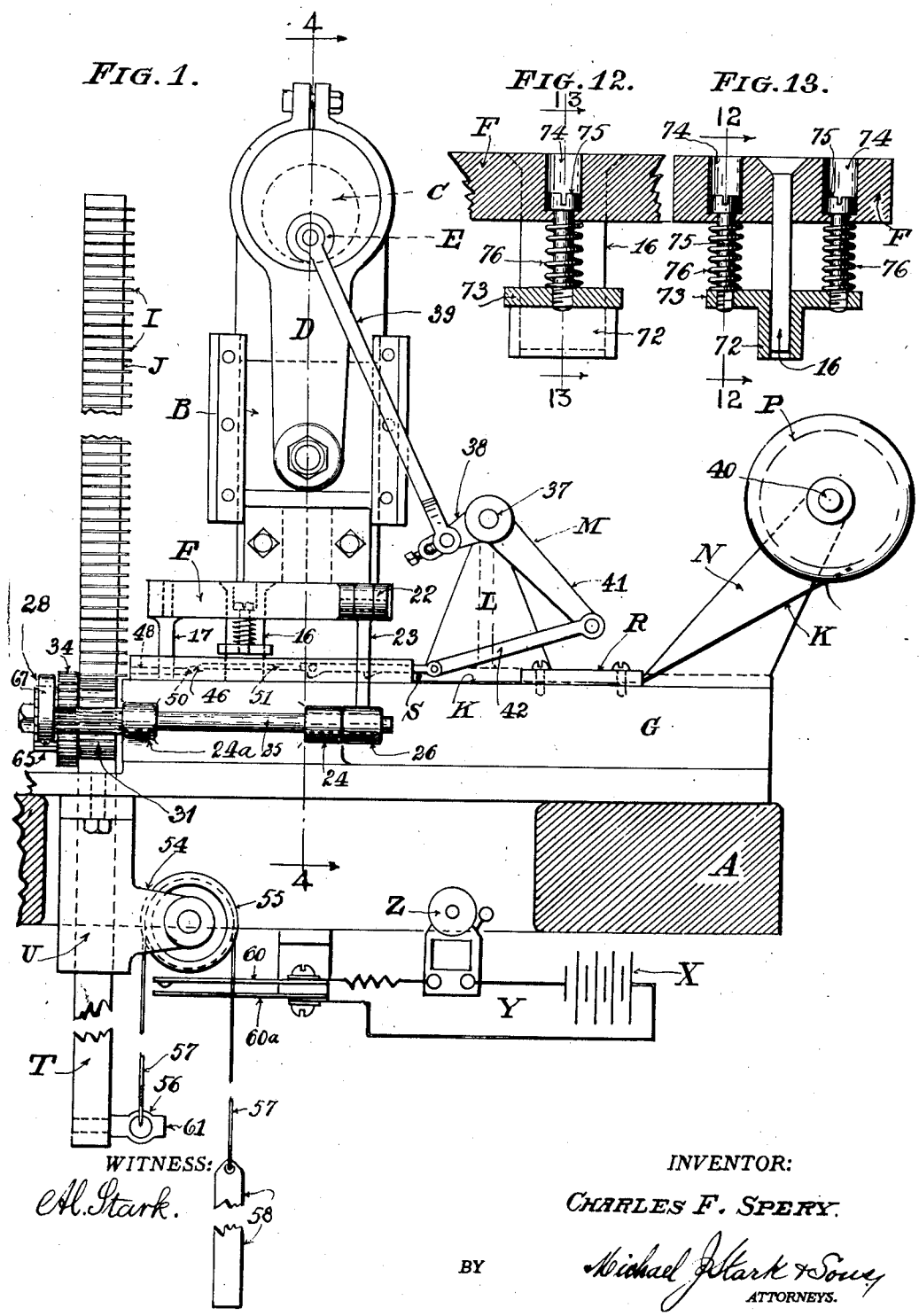
Figure 1 is a front elevation of this machine, part of the punching press being shown in section.

This mechanism for making the fins of, and applying them automatically to, the water tubes of radiators of the nature employed for cooling the water used in internal combustion engines for maintaining the engine at a proper temperature, is especially designed for use in a power punching press of any desired design but is best adapted for use in the well-known "Stiles" press, a portion of which is best illustrated in Fig. 4. This punching press has a bed A, upon which the mechanism above referred to is mounted. This press has above the bed A a vertically reciprocating slide B, which is operated from a rotatable crank shaft C having a wrist pin E, by a connecting rod D. To this slide there is removably secured a punch-holder F, to which reference will hereinafter be had.

Upon the bed A of the press there is mounted in any desired manner, a die holder or shoe G; and in this shoe there is secured a perforating and shearing or cutting-off die H. This die has a slotted opening 12, one end of which is semi-circular;

and at a proper distance from this slotted opening 12 there is in the die H, a second opening 14, which has an approximately semi-circular projection 15. By means of this die and the corresponding punches 16, 17, Fig. 1, fitted to the punch holder F, the fin I of a water tube J is formed. This fin, as shown in Fig. 2 is made of a thin strip or ribbon of sheet metal K, of substantially horseshoe contour. The slot in this fin is of a length and width corresponding to the width and thickness of the water tube J; and the fin is sufficiently longer and wider than the water tube to project therefrom a predetermined distance so that this fin surrounds the water tube on its two sides and one of its ends or edges.

The water tube is of oblong transverse contour and has its two sides corrugated or crimped, as at 20, to afford between these corrugations crotches 21; and it is in these crotches that the fins I are located. This water tube is vertically moved in the machine by a step-by-step movement, the means for thus moving the water tube including the following elements:

On the punch holder F, there are formed two puncture lugs 22, Figs. 4 and 5; and between these lugs there is pivoted a link 23. From the shoe G extend two bearing bosses 24, 24$^a$ in which there is horizontally journaled a rocking shaft 25 carrying at one end an arm 26, to which the link 23 is pivotally connected. To the other end of this rocking shaft 25 there is affixed a second arm 27, to the terminal of which there is pivoted a ratchet dog 28. Attached to the arm 26 on the rocking shaft 25, there is a blade, or other, spring 67, preferably by a screw 68. This spring terminates in a hook 69; and in the proper position, there is in the arm 26, a notch, or other element 70, wherewith this hook 69 engages when the dog 28 is lifted to disengage it from the ratchet wheel 36, for the object hereinafter to be referred to.

Figure 3:
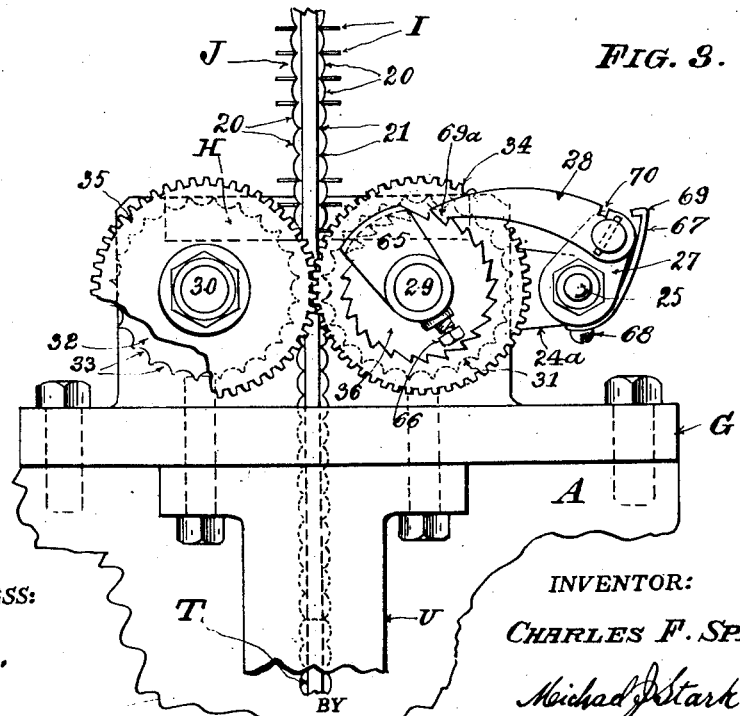
Fig. 3 is an end-elevation of that portion of the machine which is illustrated in Fig. 2.

In the shoe G, at one end thereof, there are fixed two studs 29, 30, upon which there are rotatably mounted two feed rollers, 31, 32, which feed rollers are transversely grooved as at 33 in Figs. 3 and 6, to fit the corrugations or crimps 20 in the water tube, so that by rotating these feed rollers in the proper direction the water tube is vertically moved; and in order that these two feed rollers move in perfect unison, there are secured thereto a pair of intermeshing gear wheels 34, 35; and to the face of the gear wheel 34 there is secured a ratchet wheel 36, which is moved by the dog 28 hereinbefore mentioned.

Figure 2:
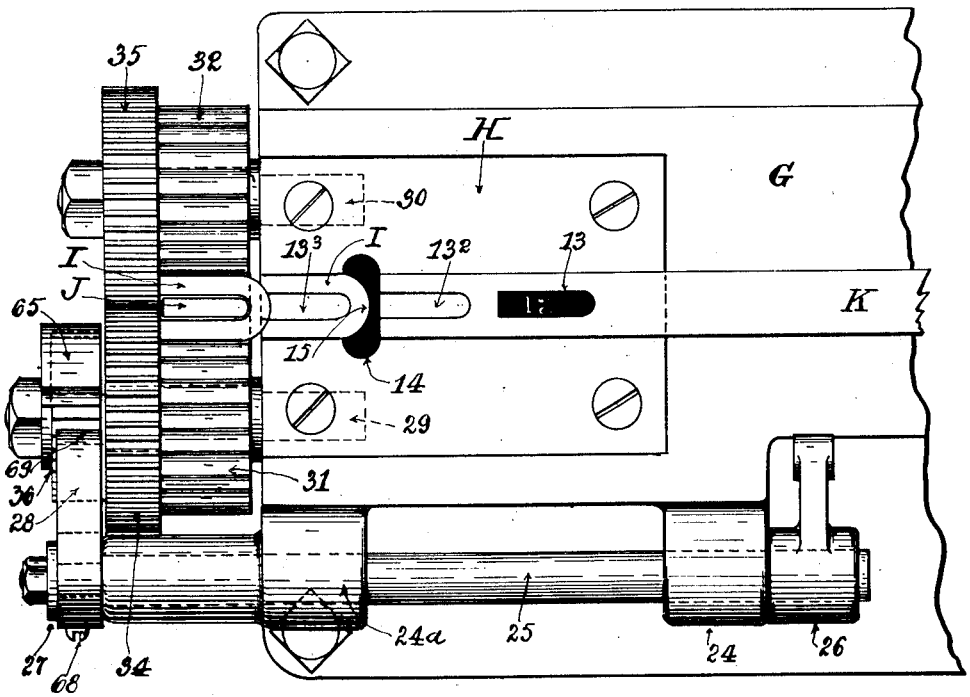
Fig. 2 is a plan, on an increased scale, of the die and part of the feeding mechanism for the water tube employed in this machine, all parts above the die proper being omitted.

Upon the shoe G and secured thereto, there is mounted a standard L, Figs. 1 and 5. in which there is mounted a rocking shaft 37, upon which there is affixed a bell crank lever M, to the short arm 38 of which there is pivoted a connecting rod 39, at one of its ends, the other end of said connecting rod engaging an extension of the wrist pin E of the crank shaft C, as best illustrated in Fig. 5.

Near the end of the shoe G there is mounted a second standard N, at the upper terminal of which there is fixed a stud 40, upon which there is rotatably mounted a spool P, to receive a roll or coil of the metallic ribbon K. This ribbon is passed over the die H by mechanism including the bell-crank lever, in a step-by-step movement, in the following manner:—

The operator pushes the end of the ribbon through a guard or guide R, located upon the shoe G, far enough to cover the slotting opening 12 in the die and then causes the punching press to make one stroke which will punch the oblong hole 13 in the ribbon. The ribbon is now moved a distance equaling the length of the fin I and then the operator causes the punching press to make another stroke. This will punch a second slot hole 13$^2$ in the ribbon, which is then again moved a distance corresponding to the length of the fin and by again starting the punching press, a third slot hole 13$^3$ is punched in the ribbon, while the punch 17 in conjunction with the die opening 14 cuts off one completed fin from the ribbon. This step-by-step movement of the ribbon, is, however, automatically performed, as hereinbefore mentioned, by the following mechanism:

To the long arm 41, of the bell-crank N is pivoted a link 42 at one of its ends, the other end of the link being pivotally connected to a push-bar S, shown detached in Fig. 8. This push bar has at its forward terminal a downwardly projecting nose 43, the end of which is semi-circularly formed as at 44, to correspond to the semi-circular formation of one end of the fin I, and at the proper distance from this end the push-bar S has a second, but narrow, projection or nose 45, which latter nose is constructed to enter the slot holes 13, 13$^2$, etc., in the ribbon K. After the first slot hole 13 has been punched into the ribbon the push-bar S moves forward and when the nose 45 reaches this slot hole and drops into the same, it pushes the ribbon along a distance equal to the length of one fin plus a very short portion which is afterward cut off from the ribbon by the punch 17. This movement continues for the second, and then the third slot-hole 13$^3$ but at the same time that the third slot hole 13$^3$ is being punched, the first fin is cut off from the ribbon and when the fourth slot hole 13 is being punched into the ribbon, the forward nose 43 engages the semi-circular end of the fin and pushes it along upon the tube J. To cause the push-bar S to operate properly, there are placed upon the die two guards or guides 46, 46ª, in spaced apart relationship, best shown in Fig. 7. These guides have close to the face of the die H, shallow grooves 47, which fit the ribbon a close sliding fit; and above these grooves there are channels 48, which are engaged by pins 49, projecting laterally from near the forward terminal of the push-bar S. These channels 48 are, for a predetermined distance from their ends, parallel to the face of the die, and then have an upwardly inclined portion 50, which terminates in a longer portion 51, which is again parallel to the face of the die. When the push-bar S begins its forward movement, the pins 49 move in the channels 51 and thereby keep the noses 43 and 45 free of the ribbon K; but when these pins reach the inclined portions 50 of the channels, the forward end of the push-bar will be depressed so that the nose 45 is pushed into the slot-hole 13 in said ribbon, while at the same time the semi-circular end 44 of the push-bar engages the fin I which is ready to be pushed onto the water tube.

In order that the various movements of the punches, the push-bar, and the feeding rolls coöperate properly, these movements are timed in the following manner:—

When the slide of the punching press and the punches approach their lowest point of the down-stroke of the press, the pusher begins its forward movement and reaches and passes underneath the punches after the punches have begun to recede, and reaches the limit of its forward movement at the same time that the punches reach their limit of upward movement. When the slide with its punches starts on its downward movement, the pusher starts on its return stroke, so that when the punches are approaching the limit of their downward movement, the pusher has just passed or cleared these punches but keeps on its retrograde movement until the press slide has reached the limit of its downward movement. It will thus be observed that the total movement of the push-bar in its forward and return movements exceeds the distance which the ribbon and the finished fin must travel, by the distance that the push-bar travels on its forward movement from its starting point until it reaches the slotting punch 16, during which time the punches have reached their downward limit and have started their return stroke, which is necessary to prevent the punches from stepping upon the push-bar.

At the moment that the slide of the punching press starts its return movement the ratchet lever with its dog also starts its return movement, but the dog does not begin to rotate the ratchet wheel which operates the tube-feeding rollers 31, 32, until the slide approaches the limit of its upward movement. In the meantime the fin I has been formed and applied to the tube so that when the tube is moved upwardly by the feeding rolls, the distance of one crotch in the tube, the latter is in position to receive another fin, and this operation of the punch press and its accessories is continued until the entire tube has been supplied with fins.

In order to positively feed the water tube upwardly, I provide a mandrel T, the lower end of which is of the same size as the water tube, but it has its upper end 52 reduced in width and thickness, as shown in Figs. 10 and 11 to fit the interior of the water tubes by a snug fit, said reduced portion affording a shoulder 53 against which the water tube bears. To the shoe G there is secured a downwardly extending tubular guide U, in which the water tube and the mandrel slide. This tubular guide has laterally extending lugs 54 at its lower end, in which there is rotatably mounted a sheave 55. At the lower end of the mandrel T there is located an eye or hook, to which is hitched a cord or light cable 57, which passes over the sheave 55 and carries at its end a counter weight 58. This counter weight slightly over-balances the weight of the mandrel and the water tube so that the upward movement of the tube by the feeding rolls is greatly assisted by this counter weight.

When the machine is ready to start its operation, the dog 28 is released from the ratchet wheel, by the operator of the punching press, and then the first three steps of punching the slot holes 13 in the ribbon are performed. Now the operator pushes a water tube upon the projecting narrower portion of the mandrel T, and then pushes the water tube and the mandrel down until the upper end of the water tube is in position to receive its first fin, after which the operator reëngages the ratchet dog 28 with the ratchet wheel 36 and then starts the punching press for continuous operation, each stroke of which now makes a complete fin and pushes it upon the water tube.

In its upward movement, the water tube is practically moved by the feeding rolls engaging the corrugations of the water tubes; but since there is a certain distance between the opposing grooves 33 of the feeding rolls and the top of the die, where the water tube can no longer be fed by its corrugations on account of its having passed these opposing grooves in the feeding rolls, I form on the lower portion of the mandrel a certain number of corrugations 59, Figs. 10 and 11, which are, in part, a continuation of the water tube corrugations, and will feed the water tube upward until the tube is completely supplied with fins. And in order that the punching press be stopped when the last radiating fin has been applied to a water tube, I locate under the press bed A, a pair of electrically insulated metallic contact plates 60, 60ª, which are in an electric circuit Y, connected to a source of electrical energy X, as illustrated in Fig. 1. In this electrical circuit is included an alarm bell Z or other means which will notify the operator of the machine that the lower end of water tube has been reached and supplied with radiating fins; there being on the lower end of the mandrel I a projection 61, which, contacting with the lower one 60ª, of the two metallic contact blades 60, 60ª, will push this blade upwardly to contact with the upper blade and, by thus closing the electric circuit, give the proper alarm.

The throw or movement of the ratchet dog exceeds that required to rotate the ratchet wheel the distance of one tooth, in order to provide for a delay in the starting of ratchet wheel 36, to give the punches and the push bar time to perform their functions before the water tube is being moved. To accomplish this object, I place over the periphery of the ratchet wheel 36 a guard 65, best seen in Fig. 3, so that when the ratchet dog, in its forward movement, reaches this guard, its free end moves upon the guard a certain distance, and in its return movement the hook on the dog moves backward upon this guard until near the completion of its retrograde movement when it will drop and engage the nearest ratchet tooth and move the ratchet wheel the distance of one tooth, it being understood that there are as many teeth in the ratchet wheel as there are grooves in one of the feeding rolls.

This guard 65 over the ratchet wheel is movably secured upon the stud 29, that carries one of the feed wheels and one of the gear wheels by a set screw 66, so that its correct position may be located with certainty.

I have hereinbefore stated that the ratchet feeding device is operated by being connected to the punch holder by the link 23, but it is evident that this feeding mechanism may be otherwise operated from any other reciprocating or rotary part of the power press. And likewise, instead of operating the push-bar from the wrist pin of the machine, it may be operatively connected to any other rotating or reciprocating part of the machine.

Since the slotting punch 16, when piercing the ribbon K, will cause this ribbon to adhere tightly to the punch and will lift the ribbon from the die, which is not permissible, I place over the punch a spring-pressed stripper which consists of a tube 72, best seen in Fig. 12, having at its upper end a collar 73. In the punch holder F there are oppositely located bores 74, in which there are movably placed screws 75, which engage the collar on the stripper tube, and which are surrounded by coil springs 76. Normally the stripper tube 72 extends slightly beyond the lower end of the punch 16 so that when the punch 16 has completed its downward movement, the stripper tube, which reaches the ribbon in advance of the slotting punch 16, has been pressed upon the ribbon by the springs 76, and will retain this position until the punch 16 has been withdrawn from the ribbon in its return movement, thereby stripping the ribbon from the slotting punch 16. Inasmuch as the cutting punch 17 entirely severs the finished fin from the ribbon there is no necessity for a stripper for this cutting punch, but a stripper such as heretofore described with reference to the slotting punch may be installed if desired or found necessary for the proper functioning of the machine.

In order that the two holes 12 and 14 in the die H may be readily distinguished from the punched holes 13, 13², and 13³ in the ribbon, I have shown these two holes in Fig. 2 in solid black.

Attention is now invited to the fact that although water tubes for radiator cores are made of various lengths to suit various conditions of capacity of the radiator, my present machine is constructed to receive these various water tubes without changing the adjustment thereof. Thus a water tube when being placed into the machine for receiving its cooling fins is pushed upon the mandrel T and then the mandrel and its water tube depressed until the upper end of the water tube is in proper position to receive its first cooling fin. The capacity of the machine is planned to receive the longest water tube, after which the water tube and the mandrel move upwardly until the lower end of the water tube is in position to receive the last one of the cooling fins, when the alarm will be given and the machine stopped. Should the operator of the machine neglect to stop the machine promptly when the alarm is sounded, it will happen that some of the completed cooling fins will be pushed into the crotches between the corrugations of the mandrel, without doing any other damage than to waste a few cooling fins which have to be pulled off the mandrel before placing thereon a new water tube.

I have hereinbefore described with considerable minuteness the preferred embodiment of my invention, but I desire it to be understood that I am aware that changes in the details of construction may be made, and parts omitted without departing from the scope of my invention as defined in the appended claims.

Having thus fully described this invention, I claim as new, and desire to secure to myself by Letters Patent of the United States—

1. An automatically operating machine for producing cooling fins for, and applying them to, the water tubes of radiators, comprising, in combination, a die proper and a coacting punch, there being in said die proper an oblong perforating opening, and spaced therefrom a shearing element, means for vertically moving a water tube when placed in the machine by a step-by-step movement, means for moving a metallic ribbon over said die proper by a step-by-step movement, and means for pushing a finished cooling fin onto said water tube while the latter is at rest, said punch being constructed to coact with said die proper in punching said oblong opening and cutting off said finished cooling fin.

2. In a machine of the nature described, the combination, of a die proper and a coacting punch, said die proper and the coacting punch being constructed to perforate and cut off from a metallic ribbon portions to form cooling fins, a pair of coacting feeding rolls for vertically moving a water tube by a step-by-step movement in the machine, a reciprocating push-bar constructed to move a metallic ribbon by a step-by-step movement, said push-bar having means for engaging, one at a time, the portions cut off from said ribbon and pushing the same onto said water tube.

3. In a machine of the nature described, the combination, of a die proper and a coacting punch, said die proper and the coacting punch being constructed to perforate a metallic ribbon at equally spaced points with oblong perforations corresponding to the transverse contour of a water tube, and to cut off from said ribbon portions to form cooling fins, a pair of coacting feeding rolls for vertically moving a water tube when placed in the machine by a step-by-step movement, a reciprocating push-bar constructed to move said metallic ribbon by a step-by-step movement over said die proper, said push-bar having means for engaging said ribbon in said perforations and further means for pushing the portions cut off from said ribbon onto said water tube, at the same time that said ribbon is being moved by said push-bar.

4. In a machine of the nature described, the combination, of a die proper and a coacting punch, said die and punch being constructed to perforate a metallic ribbon by a step-by-step movement of said ribbon while being at rest and to sever from said ribbon a portion which has been perforated, and to push said severed portion onto a water tube when placed in the machine, means for moving said water tube by a step-by-step movement, said means including coacting feed rolls, and means for rotating said feed rolls at predetermined intervals, and means for moving said ribbon upon said die proper at regular intervals.

5. In a machine of the nature described, the combination, of a die proper and a coacting punch, said die and punch being constructed to perforate a metallic ribbon at regular, predetermined, intervals and at the same time to cut off from the end of said ribbon a portion suitable to form a substantially U-shaped cooling fin when applied to a water tube and means for automatically moving said ribbon over said die and pushing the formed cooling fin upon said water tube.

6. In a machine of the nature described, the combination, of a perforating and shearing die and punch, for cutting up a metallic ribbon into separate cooling fins by said shearing die and punch, mechanism for feeding said metallic ribbon over said die, said die having an oblong perforating opening, and spaced therefrom a shearing element, said feeding mechanism including a reciprocating push-bar, said push-bar having means for positively engaging said ribbon and to move the same during the forward movement of said push-bar and to clear said ribbon during its return movement, said punch being constructed to coact with said die and shearing element.

7. In a machine of the nature described, the combination, of a die, a punch holder, there being in said die an oblong punching opening, and on said punch-holder an oblong punch constructed to enter said oblong punching opening in said die, means for intermittently moving a metallic ribbon over said die to produce therein a successive series of oblong perforations, said means for intermittently moving said ribbon including a reciprocating push-bar, said push-bar having means for entering said oblong perforations and pushing said ribbon along during a portion of its forward movement.

8. In a machine of the nature described, the combination, of mechanism for perforating a metallic ribbon and for cutting off the end thereof successively portions adapted to form cooling fins, means for moving said ribbon by a series of movements over the perforating means, said latter means including a reciprocating element, a bell-crank lever, said bellcrank lever having one arm connected to said reciprocating element for imparting movement to said bellcrank lever, a push-bar pivotally connected to the other arm of said bellcrank lever, said push-bar having an element constructed to enter said perforations in said ribbon and to move said ribbon a distance equal to the spacing or pitch of said perforations.

9. In a machine of the nature described, the combination, with a punching press, of means for perforating a metallic ribbon and moving said metallic ribbon by a step-by-step movement over said perforating means, means for successively cutting off from the end of said ribbon portions each of which include one of said perforations, and means for pushing said cut-off portions onto a water tube when placed in the machine.

10. In a machine of the nature described, means for automatically producing U-shaped cooling fins and applying them to a flat water tube, means for intermittently moving said flat tube when located in said machine, a die and a coacting punch, said die having an oblong perforating opening equal in width to the thickness of said water tube and slightly longer than the width of said water tube, a shearing opening in said die in spaced apart relationship to the perforating opening, means for operating said punching and shearing means, means for moving a ribbon by a step-by-step movement over said perforating and shearing elements, said shearing element being constructed to sever a portion from the end of the perforated portion of said ribbon through the forward end of each of said perforations to open said perforations, and means for pushing each severed portion upon said water tube.

11. In a machine of the nature described, means for perforating a metallic ribbon at predetermined intervals with oblong perforations, means for cutting off an end portion of said ribbon equal in length to the pitch of said perforations, and means for intermittently moving said ribbon, said latter means including a reciprocating push-bar, a pair of spaced apart guides for said ribbon and said push-bar, said guides having grooves to receive said ribbon and further grooves or guide-ways above the first-mentioned grooves, said latter guide-ways having upwardly inclined portions, said push-bar having lateral projections engaging said guide-ways, said push-bar having means for engaging the perforations in said ribbon, and further means for engaging the end of the severed portion of said ribbon and pushing the same along while moving said ribbon.

12. In a machine of the nature described, means for vertically moving a water tube in said machine by a step-by-step movement to receive cooling fins while the tube is at rest, said means including a pair of rotatable feeding rolls constructed to engage said water tube, a ratchet wheel connected to one of said feeding rolls, a pawl or dog for intermittently rotating said ratchet wheel, means for reciprocating said dog, a guard over a portion of said ratchet wheel to lift said dog out of engagement with said ratchet wheel during a portion of the forward and backward movement of said dog.

13. In a machine of the nature described, means for vertically moving a water tube in said machine by a step-by-step movement to receive cooling fins while the tube is at rest, said means including a pair of rotatable feeding rolls constructed to engage said water tube, a ratchet wheel connected to one of said feeding rolls, a pawl or dog for intermittently rotating said ratchet wheel, means for reciprocating said dog, a guard over a portion of said ratchet wheel to lift said dog out of engagement with said ratchet wheel during a portion of the forward and backward movement of said dog, a mandrel constructed to receive said water tube, a guide for said water tube and for said mandrel, and means for counterbalancing said water tube and said mandrel.

14. In a machine of the nature described, means for vertically moving a water tube in said machine by a step-by-step movement to receive cooling fins while at rest, said means including a pair of rotatable feeding rolls constructed to engage said water tube, a ratchet wheel connected to one of said feeding rolls, a pawl or dog for intermittently rotating said ratchet wheel, means for reciprocating said dog, a guard over a portion of said ratchet wheel to lift said dog out of engagement with said ratchet wheel during a portion of the forward and backward movement of said dog, a mandrel constructed to receive said water tube, a guide for said water tube and said mandrel, means for counterbalancing said water tube and said mandrel, an open electrical circuit, means in said electrical circuit for giving an alarm, a pair of contact plates in said electrical circuit and means for closing said electrical circuit when said water tube has been supplied with its complement of cooling fins.

In testimony that I claim the foregoing as my invention, I have hereunto set my hand.

CHARLES F. SPERY.